Nov. 1, 1932.  W. J. WINSELMAN  1,885,975
RUMBLE SEAT
Filed June 25, 1931  2 Sheets-Sheet 1
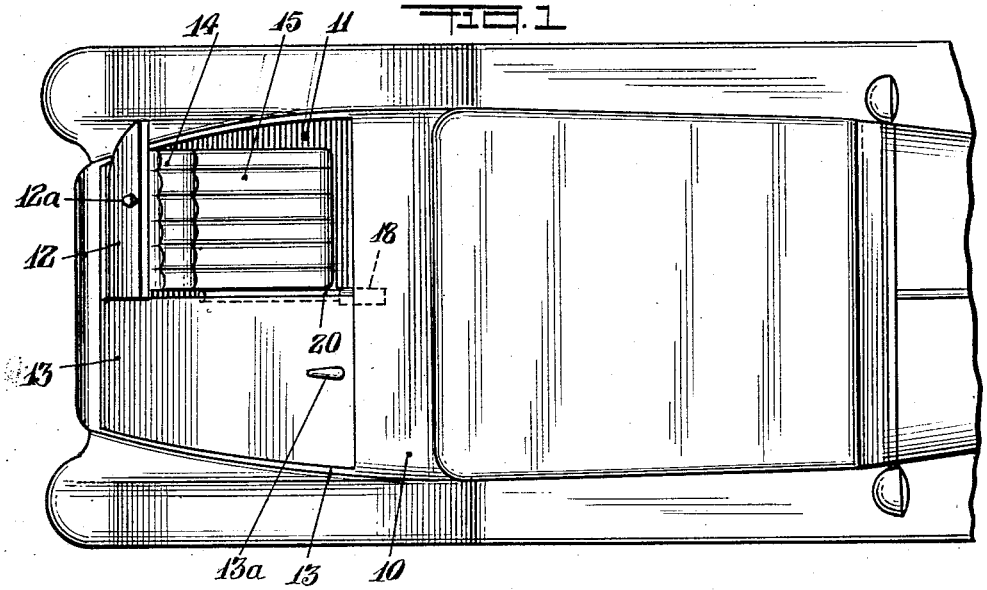
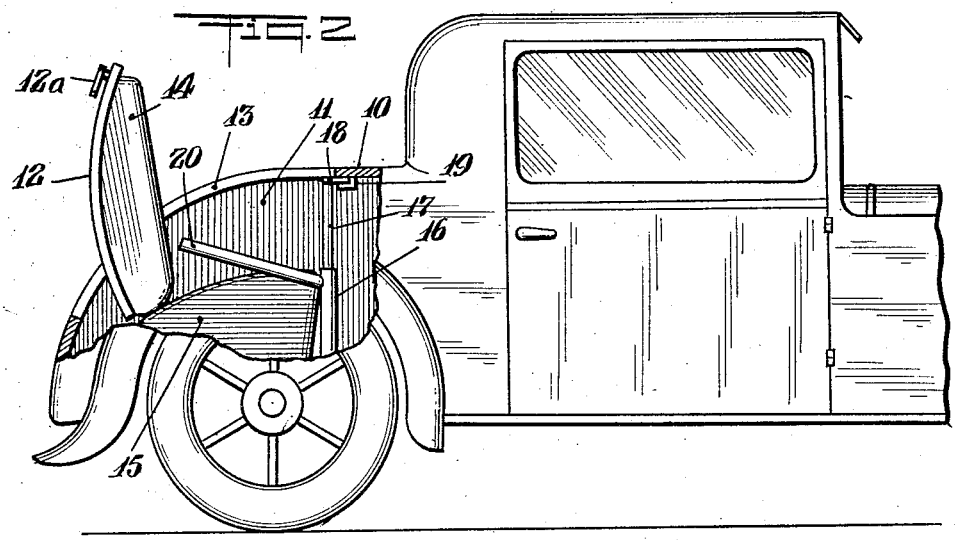
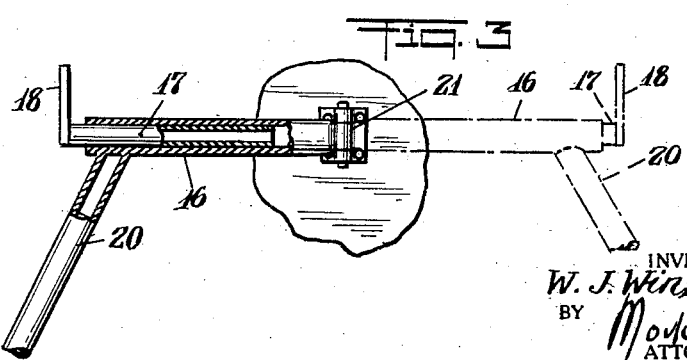
INVENTOR
W. J. Winselman
BY
ATTORNEYS Nov. 1, 1932.  W. J. WINSELMAN  1,885,975
RUMBLE SEAT
Filed June 25, 1931  2 Sheets-Sheet 2
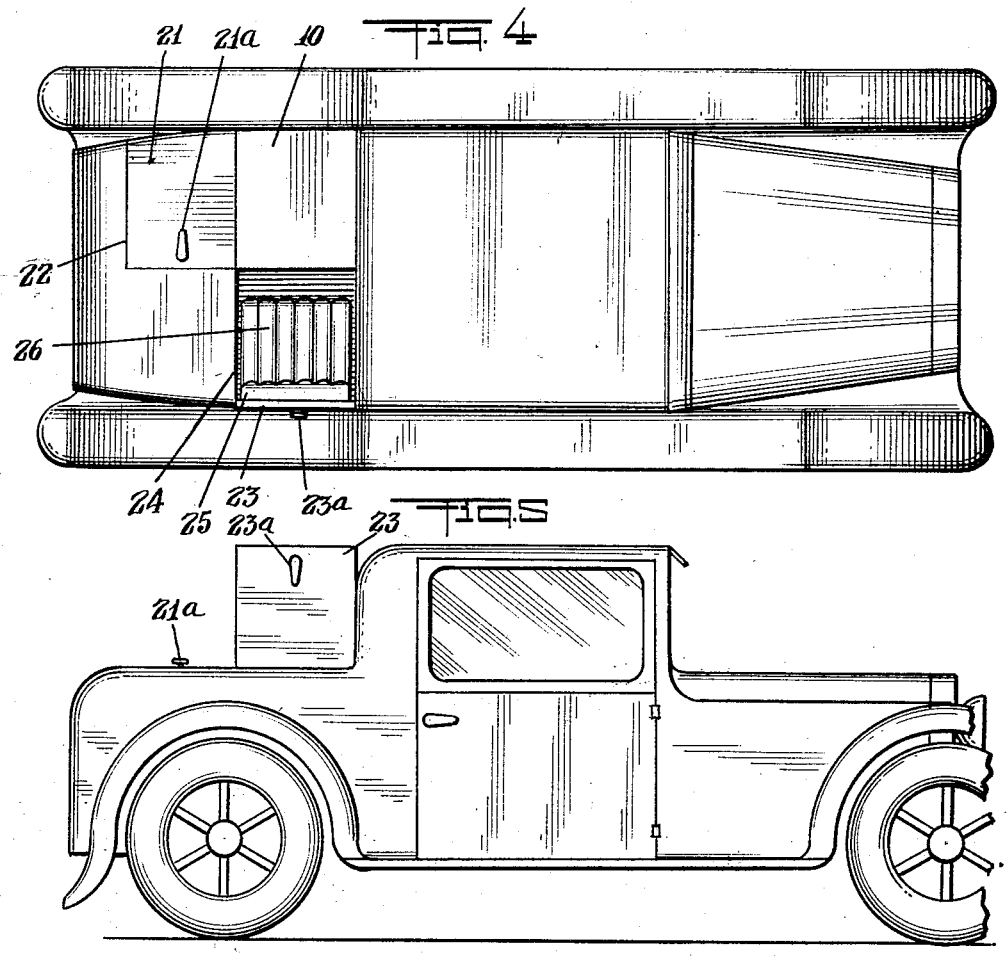
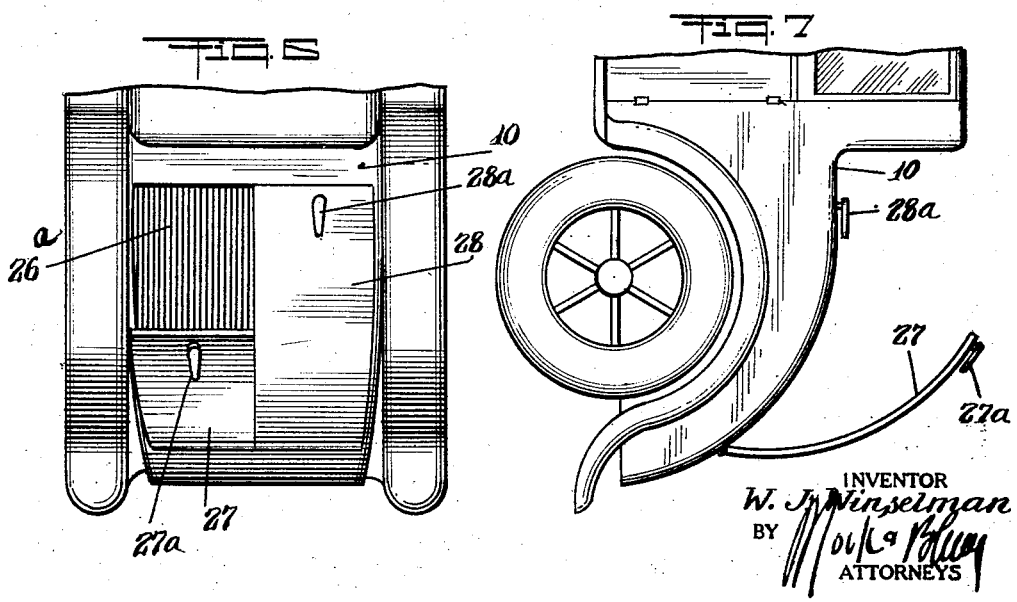
INVENTOR
W. J. Winselman
BY
ATTORNEYS Patented Nov. 1, 1932

1,885,975

UNITED STATES PATENT OFFICE

WILLIAM J. WINSELMAN, OF BROOKLYN, NEW YORK

RUMBLE SEAT

Application filed June 25, 1931. Serial No. 546,780.

This invention relates to improvements in automobiles and more particularly to rumble seats in automobiles.

A particular object of this invention is the provision of a novel form of rumble seat which may be used either for carrying passengers or luggage and at times, both.

Another object of the invention is the provision of a novel form of rumble seat in which it is possible to simultaneously use the space assigned to the rumble seat for both luggage and a single passenger if desired, and in which the space occupied by the passenger in the rumble seat will be such that his presence in the automobile can at no time obstruct the rear view of the driver of the automobile.

Further objects of the invention will be apparent from the specification and drawings in which Fig. 1 is a top plan view of my improved rumble seat.

Fig. 2 is a side view partly in section.

Fig. 3 is a sectional detail view of a partition member.

Fig. 4 is a top plan view of a modified form of improved rumble seat.

Fig. 5 is a side elevation of the form of car.

Fig. 6 is a top plan view of the rear portion of the automobile shown in Fig. 4.

Fig. 7 is a side view of the construction shown in Fig. 6.

10 designates the rear part of the body of the car.

11 is the interior of the rumble seat.

12 and 13 designate the sections of the rumble seat covers which serve as backs for the rumble seats themselves when opened.

12a and 13a respectively designate the handles by which said covers may be grasped.

14 designates the upholstery of the rear of the seat attached to the cover 12.

15 is the seat itself.

16 is a partition rail having the extensible member 17 with the flat head 18 fitting into the hook 19. The partition rail 16 has the arm-rest 20 attached thereto. The rail 16 is attached to the floor by the hinge 21 and when not in use the rail 16 together with attachments thereto may be collapsed and rest on the floor as shown in outline in Fig. 3.

In the embodiment of my improved rumble seat shown in Fig. 4, I show the seats vis-a-vis of each other instead of along side each other, and in Fig. 4, the covers for the rumble seat are designated by the numbers 21 and 23 respectively.

22 and 24 designate the interiors of the rumble seat shown in Fig. 4.

25 is the upholstery of the back attached to the cover 23.

26 is the seat thereof.

21a and 23a designate respectively the handles for raising the covers 21 and 23.

Fig. 6 represents a modification of my improved rumble seat or rumble seat space where the said space is used for luggage only.

26a designates the interior of this space.

27 and 28 designate the covers for this space and 27a and 28a the handles for said covers.

One of the principal objects of my invention is the provision of a bisected rumble seat so that the rear space in the automobile usually allotted to the rumble seat, may be entirely used for passengers or entirely used for luggage, or partly used for luggage and part of the space employed for passengers.

This object is accomplished in part by bisecting the covers which are usually employed for the rumble seat portion of the car and which, when the rumble seat is opened, constitute the back portion of the seat.

As is clearly shown in Figs. 1 and 2 of the drawings, half of the rumble seat may be opened up and half may remain closed, and in the usual practice with this improved form of construction, it is obvious that if one half of the rumble seat is employed to house a passenger, the part employed is preferably the right-hand side as in that way the body of the passenger will not obstruct the rear view of the driver seated on the left side of the car.

The partition rail 16 clearly shown in Fig. 2 of the drawings, not only provides an arm rest for the passenger, but also definitely divides the luggage space from the space for the single passenger and there is no tendency for the single passenger to shift his position when this rail is provided even if both covers of the rumble seat are opened.

Fig. 4 shows a different embodiment of this invention in which the two passengers in the rumble seat may sit vis-a-vis each other and in which adequate leg space is provided for both passengers.

In the third modification shown in Figs. 6 and 7, the space in the rear of the car which is usually furnished with rumble seats, is used for luggage only but the cover is bisected so that in case it is desired to protect part of the luggage by leaving the cover down or part of the luggage is too bulky so that it cannot be confined within both covers, one of the covers may be opened and the other closed.

In practice, it may also be found desirable to use the partition rail 16 and the arm rest 20 as a support for an umbrella in case of rain or for a sun shading device in case of excessive heat. It is also apparent that the separate covers 12 and 13 have independent hinges so that one may be raised without reference to each other, but the hinges may be of any satisfactory type, and are not illustrated in the drawings.

Having fully described my invention, what I claim is:

1. In an automobile having a rumble seat, a plurality of covers for said rumble seat, adjacent and diagonally opposite to each other, said covers being capable of being raised independently of each other.

2. In an automobile having rumble seats, a plurality of covers for said rumble seats adjacent and complementary to each other, said covers being capable of being raised independently of each other, demountable dividing means located at the point of junction of said covers, said demountable dividing means being hingedly mounted to the floor and having the top thereof engaging the top of the rear of the car.

3. In an automobile having rumble seats, a plurality of covers for said rumble seats, said covers being spaced opposite and diagonally to each other and being capable of being raised independently to each other, so as to permit the occupants of said rumble seats to sit facing each other.

In testimony whereof I affix my signature.

WILLIAM J. WINSELMAN.